US008512595B2

(12) United States Patent
Meyer et al.

(10) Patent No.: US 8,512,595 B2
(45) Date of Patent: Aug. 20, 2013

(54) SURFACE-MODIFIED, PYROGENICALLY PREPARED SILICAS

(75) Inventors: Juergen Meyer, Stockstadt (DE); Mario Scholz, Gruendau (DE); Kai Schumacher, Hofheim (DE)

(73) Assignee: Evonik Degussa GmbH, Essen (DE)

( * ) Notice: Subject to any disclaimer, the term of this patent is extended or adjusted under 35 U.S.C. 154(b) by 294 days.

(21) Appl. No.: 12/669,901

(22) PCT Filed: Jul. 1, 2008

(86) PCT No.: PCT/EP2008/058418
§ 371 (c)(1),
(2), (4) Date: Jan. 20, 2010

(87) PCT Pub. No.: WO2009/015970
PCT Pub. Date: Feb. 5, 2009

(65) Prior Publication Data
US 2010/0200803 A1    Aug. 12, 2010

(30) Foreign Application Priority Data
Jul. 30, 2007    (DE) .......................... 10 2007 035 952

(51) Int. Cl.
*C09K 3/00* (2006.01)
*C01B 33/12* (2006.01)
*B05D 7/00* (2006.01)

(52) U.S. Cl.
USPC ... 252/182.2; 428/405; 428/407; 427/255.18; 427/220

(58) Field of Classification Search
USPC .................... 428/405, 407; 427/255.18, 220; 252/182.3
See application file for complete search history.

(56) References Cited

U.S. PATENT DOCUMENTS

| 5,900,315 | A | 5/1999 | Little |
| 5,989,768 | A | 11/1999 | Little |
| 6,309,563 | B1 * | 10/2001 | Iino et al. ...................... 252/514 |
| 6,414,078 | B1 * | 7/2002 | Fukushima et al. .......... 524/588 |
| 6,511,754 | B1 * | 1/2003 | Bohin et al. .................. 428/447 |
| 7,008,982 | B2 * | 3/2006 | Isarov et al. .................. 523/443 |
| 7,713,626 | B2 * | 5/2010 | Meyer et al. .................. 428/404 |
| 7,972,431 | B2 * | 7/2011 | Meyer et al. .................. 106/490 |
| 7,981,211 | B2 * | 7/2011 | Meyer et al. .................. 106/490 |
| 8,071,215 | B2 * | 12/2011 | Meyer et al. .................. 428/405 |
| 2003/0099895 | A1 | 5/2003 | Barthel et al. |
| 2003/0138715 | A1 | 7/2003 | Barthel et al. |
| 2006/0153764 | A1 | 7/2006 | Schumacher et al. |
| 2006/0177673 | A1 * | 8/2006 | Ikeno et al. ................... 428/447 |
| 2007/0166438 | A1 * | 7/2007 | Kitahata et al. ............... 426/242 |
| 2009/0143538 | A1 * | 6/2009 | Nomura et al. ............... 525/342 |
| 2009/0292097 | A1 * | 11/2009 | Scholz et al. .................... 528/38 |
| 2010/0126387 | A1 * | 5/2010 | Meyer et al. ............. 106/287.23 |
| 2010/0196243 | A1 * | 8/2010 | Meyer et al. .................. 423/335 |
| 2010/0233059 | A1 * | 9/2010 | Meyer et al. .................. 423/335 |

FOREIGN PATENT DOCUMENTS

| CN | 1167729 A | 12/1997 |
| CN | 1405084 A | 3/2003 |
| CN | 1408771 A | 4/2003 |
| CN | 1411916 A | 4/2003 |
| CN | 1745133 A | 3/2006 |
| CN | 1803605 A | 7/2006 |
| EP | 1 304 332 | 4/2003 |
| EP | 1 686 093 | 8/2006 |

OTHER PUBLICATIONS

Office Action issued May 3, 2012 in Chinese Application No. 200880025239.7 (English Translation).
Combined Office Action & Search Report issued Feb. 28, 2013 in Chinese Application No. 200880025239.7.

* cited by examiner

*Primary Examiner* — Joseph D Anthony
(74) *Attorney, Agent, or Firm* — Oblon, Spivak, McClelland, Maier & Neustadt, L.L.P.

(57) ABSTRACT

Surface-modified, pyrogenically prepared silica is prepared by subjecting the pyrogenically prepared silica, which is in the form of aggregates of primary particles having a BET surface area of $300\pm25$ m$^2$/g and the aggregates have an average area of 4800-6000 nm$^2$, an average equivalent circle diameter (ECD) of 60-80 nm and an average circumference of 580-750 nm, to surface-modification in a known way.
It can be used as a filler for controlling the rheology of liquid silicone rubber (LSR) systems.

6 Claims, No Drawings

SURFACE-MODIFIED, PYROGENICALLY PREPARED SILICAS

The invention relates to surface-modified, pyro-genically prepared silicas, to a process for preparing them and to their use.

The preparation of surface-modified pyrogenic (fumed) silicas from pyrogenically prepared silicas by surface modification is known. Silicas prepared in this way find use in many fields of application: for example, for controlling the rheology of liquid systems or in liquid silicone rubber (LSR) systems. In these applications, great importance attaches not only to the rheology control but also to the ease of incorporation into the liquid system.

The known surface-modified, pyrogenic silicas have the disadvantage that their ease of incorporation into liquid systems is unsatisfactory.

The object was therefore to prepare surface-modified pyrogenic silicas which possess an improved ease of incorporation into liquid systems without detriment to other important properties, such as the rheology control.

The invention provides surface-modified, pyrogenically prepared silicas which are characterized in that their ease of incorporation into liquid systems is improved without detriment to the rheology control.

The invention further provides a process for preparing the surface-modified, pyrogenically prepared silica, which is characterized in that the pyrogenically prepared silica, which is in the form of aggregates of primary particles having a BET surface area of $300\pm25$ m$^2$/g and the aggregates have an average area of 4800-6000 nm$^2$, an average equivalent circle diameter (ECD) of 60-80 nm and an average circumference of 580-750 nm, is surface-modified in a known way.

The pyrogenically prepared silica used as starting material is known from EP 1 686 093 A2.

The surface modification can be accomplished by spraying the silicas where appropriate with water and subsequently with the surface modifier. Spraying may also take place in the opposite order. The water used may have been acidified with an acid, hydrochloric acid, for example, to a pH of 7 to 1. If two or more surface modifiers are employed, they can be applied together, or separately, in succession or as a mixture.

The surface modifier or modifiers may have been dissolved in suitable solvents. The end of spraying may be followed by mixing for 5 to 30 minutes more.

The mixture is subsequently treated thermally at a temperature of 20 to 400° C. over a period of 0.1 to 6 h. The thermal treatment may take place under inert gas, such as nitrogen, for example.

An alternative method of surface modification of the silicas can be accomplished by treating the silicas with the surface modifier in vapour form and then thermally treating the mixture at a temperature of 50 to 800° C. over a period of 0.1 to 6 h. The thermal treatment may take place under inert gas, such as nitrogen, for example.

The temperature treatment may also take place over a number of stages at different temperatures.

The surface modifier or modifiers can be applied using single-fluid, two-fluid or ultrasound nozzles.

The surface modification can be carried out in heatable mixers and dryers with spraying installations, continuously or batchwise. Suitable apparatus may for example be the following: ploughshare mixers, plate dryers, fluidized-bed dryers or fluid-bed dryers.

As surface modifier it is possible to use at least one compound from the group of the following compounds:

a) organosilanes of type $(RO)_3Si(C_nH_{2n+1})$ and $(RO)_3Si(C_nH_{2n-1})$
   R=alkyl, such as for example, methyl-, ethyl-, n-propyl-, isopropyl-, butyl-
   n=1-20 b) organosilanes of type $R'_x(RO)_ySi(C_nH_{2n+1})$ and $R'_x(RO)_y Si(C_nH_{2n-1})$
   R=alkyl, such as for example, methyl-, ethyl-, n-propyl-, isopropyl-, butyl-
   R'=alkyl, such as for example, methyl-, ethyl-, n-propyl-, isopropyl-, butyl-
   R'=cycloalkyl
   n=1-20
   x+y=3
   x=1, 2
   y=1, 2 c) haloorganosilanes of type $X_3Si(C_nH_{2n+1})$ and $X_3Si(C_nH_{2n-1})$
   X=Cl, Br
   n=1-20 d) haloorganosilanes of type $X_2(R')Si(C_nH_{2n+1})$ and $X_2(R')Si(C_nH_{2n-1})$
   X=Cl, Br
   R'=alkyl, such as for example, methyl-, ethyl-, n-propyl-, isopropyl-, butyl-
   R'=cycloalkyl
   n=1-20 e) haloorganosilanes of type $X(R')_2Si(C_nH_{2n+1})$ and $X(R')_2 Si(C_nH_{2n-1})$
   X=Cl, Br
   R'=alkyl, such as for example, methyl-, ethyl-, n-propyl-, isopropyl-, butyl-
   R'=cycloalkyl
   n=1-20 f) organosilanes of type $(RO)_3Si(CH_2)_m$—R'
   R=alkyl, such as methyl-, ethyl-, propyl-
   m=0.1-20
   R'=methyl-, aryl (for example —$C_6H_5$, substituted phenyl radicals)
   —$C_4F_9$, —$OCF_2$—CHF—$CF_3$, —$C_6F_{13}$, —O—$CF_2$—$CHF_2$
   —$NH_2$, —$N_3$, —SCN, —CH=$CH_2$, —NH—$CH_2$—$CH_2$—$NH_2$,
   —N—$(CH_2$—$CH_2$—$NH_2)_2$
   —OOC($CH_3$)C=$CH_2$
   —$OCH_2$—CH(O)$CH_2$
   —NH—CO—N—CO—$(CH_2)_5$
   —NH—COO—$CH_3$, —NH—COO—$CH_2$—$CH_3$,
   —NH—$(CH_2)_3Si(OR)_3$
   —$S_x$—$(CH_2)_3Si(OR)_3$
   —SH
   —NR'R''R''' (R'=alkyl, aryl; R''=H, alkyl, aryl; R'''=H, alkyl, aryl, benzyl, $C_2H_4$NR''''R''''' with R''''=H, alkyl and R'''''=H, alkyl)

g) organosilanes of type $(R'')_x(RO)_ySi(CH_2)_m$—R'
   R''=alkyl x+y=3
   =cycloalkyl x=1, 2
   y=1, 2
   m=0.1 to 20
   R'=methyl-, aryl (for example —$C_6H_5$, substituted phenyl radicals)
   —$C_4F_9$, —$OCF_2$—CHF—$CF_3$, —$C_6F_{13}$, —O—$CF_2$—$CHF_2$
   —$NH_2$, —$N_3$, —SCN, —CH=$CH_2$, —NH—$CH_2$—$CH_2$—$NH_2$, —N—(CH$_2$—CH$_2$—NH$_2$)$_2$
—OOC(CH$_3$)C═CH$_2$
—OCH$_2$—CH(O)CH$_2$
—NH—CO—N—CO—(CH$_2$)$_5$
—NH—COO—CH$_3$, —NH—COO—CH$_2$—CH$_3$,
—NH—(CH$_2$)$_3$Si(OR)$_3$
—S$_x$—(CH$_2$)$_3$Si(OR)$_3$
—SH
—NR'R"R"'(R'=alkyl, aryl; R"═H, alkyl, aryl; R"'═H, alkyl, aryl, benzyl, C$_2$H$_4$NR""R"" with R""═H, alkyl and R""'═H, alkyl)
h) haloorganosilanes of type X$_3$Si(CH$_2$)$_m$—R'
X═Cl, Br
m=0.1-20
R'=methyl-, aryl (for example —C$_6$H$_5$, substituted phenyl radicals)
—C$_4$F$_9$, —OCF$_2$—CHF—CF$_3$, —C$_6$F$_{13}$,
—O—CF$_2$—CHF$_2$
—NH$_2$, —N$_3$, —SCN, —CH═CH$_2$,
—NH—CH$_2$—CH$_2$—NH$_2$
—N—(CH$_2$—CH$_2$—NH$_2$)$_2$
—OOC(CH$_3$)C═CH$_2$
—OCH$_2$—CH(O)CH$_2$
—NH—CO—N—CO—(CH$_2$)$_5$
—NH—COO—CH$_3$, —NH—COO—CH$_2$—CH$_3$,
—NH—(CH$_2$)$_3$Si(OR)$_3$
—S$_x$—(CH$_2$)$_3$Si (OR)$_3$
—SH i) haloorganosilanes of type (R)X$_2$Si(CH$_2$)$_m$—R'
X═Cl, Br
R=alkyl, such as methyl-, ethyl-, propyl-
m=0.1-20
R=methyl-, aryl (e.g. —C$_6$H$_5$, substituted phenyl radicals)
—C$_4$F$_9$, —OCF$_2$—CHF—CF$_3$, —C$_6$F$_{13}$,
—O—CF$_2$—CHF$_2$
—NH$_2$, —SCN, —CH═CH$_2$, —NH—CH$_2$—CH$_2$—NH$_2$,
—N—(CH$_2$—CH$_2$—NH$_2$)$_2$
—OOC(CH$_3$)C═CH$_2$
—OCH$_2$—CH(O)CH$_2$
—NH—CO—N—CO—(CH$_2$)$_5$
—NH—COO—CH$_3$, —NH—COO—CH$_2$—CH$_3$,
—NH—(CH$_2$)$_3$Si(OR)$_3$, it being possible for R to be methyl-, ethyl-, propyl-, butyl-
—S$_x$—(CH$_2$)$_3$Si(OR)$_3$, it being possible for R to be methyl-, ethyl-, propyl-, butyl-
—SH j) haloorganosilanes of type (R)$_2$XSi(CH$_2$)$_m$—R'
X═Cl, Br
R=alkyl
m=0.1-20
R'=methyl-, aryl (e.g. —C$_6$H$_5$, substituted phenyl radicals)
—C$_4$F$_9$, —OCF$_2$—CHF—CF$_3$, —C$_6$F$_{13}$,
—O—CF$_2$—CHF$_2$
—NH$_2$, —SCN, —CH═CH$_2$, —NH—CH$_2$—CH$_2$—NH$_2$,
—N—(CH$_2$—CH$_2$—NH$_2$)$_2$
—OOC(CH$_3$)C═CH$_2$
—OCH$_2$—CH(O)CH$_2$
—NH—CO—N—CO—(CH$_2$)$_5$
—NH—COO—CH$_3$, —NH—COO—CH$_2$—CH$_3$,
—NH—(CH$_2$)$_3$Si(OR)$_3$
—S$_x$—(CH$_2$)$_3$Si(OR)$_3$
—SH k) silazanes of type

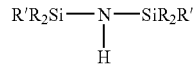

R=alkyl, vinyl, aryl
R'=alkyl, vinyl, aryl l) cyclic polysiloxanes of type D 3, D 4, D 5, with D 3, D 4 and D 5 meaning cyclic polysiloxanes having 3, 4 or 5 units of type —O—Si(CH$_3$)$_2$—. e.g. octamethylcyclotetrasiloxane=D 4

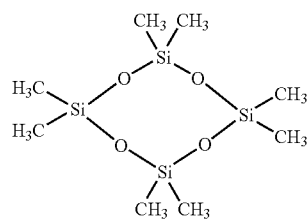

m) polysiloxanes or silicone oils of type

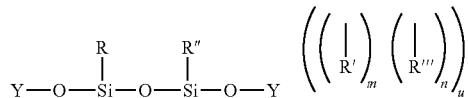

m=0,1,2,3, . . . ∞
n=0,1,2,3, . . . ∞
u=0,1,2,3, . . . ∞
Y═CH$_3$, H, C$_n$H$_{2n+1}$ n=1-20
Y═Si(CH$_3$)$_3$, Si(CH$_3$)$_2$H
Si(CH$_3$)$_2$OH, Si(CH$_3$)$_2$(OCH$_3$)
Si(CH$_3$)$_2$(C$_n$H$_{2n+1}$) n=1-20
R=alkyl such as C$_n$H$_{2n+1}$, n being 1 to 20, aryl, such as phenyl radicals and substituted phenyl radicals, (CH$_2$)$_n$—NH$_2$, H
R'=alkyl such as C$_n$H$_{2n+1}$, n being 1 to 20, aryl, such as phenyl radicals and substituted phenyl radicals, (CH$_2$)$_n$—NH$_2$, H
R"=alkyl such as C$_n$H$_{2n+1}$, n being 1 to 20, aryl, such as phenyl radicals and substituted phenyl radicals, (CH$_2$)$_n$—NH$_2$, H
R"'=alkyl such as C$_n$H$_{2n+1}$, n being 1 to 20, aryl, such as phenyl radicals and substituted phenyl radicals, (CH$_2$)$_n$—NH$_2$, H As surface modifiers it is preferred to use the following silanes:
octyltrimethoxysilane, octyltriethoxysilane, hexamethyldisilazane, 3-methacryloyloxypropyltrimethoxysilane, 3-methacryloyloxypropyltriethoxysilane, hexadecyltrimethoxysilane, hexadecyltriethoxysilane, dimethylpolysiloxane, glycidyloxypropyltrimethoxysilane, glycidyloxypropyltriethoxysilane, nonafluorohexyltrimethoxysilane, tridecafluorooctyltrimethoxysilane, tridecafluorooctyltriethoxysilane, aminopropyltriethoxysilane, hexamethyldisilazane.

With particular preference it is possible to use hexamethyldisilazane, dimethylpolysiloxane, octyltrimethoxysilane and octyltriethoxysilane.

More particularly it is possible to use hexamethyldisilazane.

The surface-modified, pyrogenically prepared silica of the invention can be used as a filler for liquid silicone rubber (LSR).

The invention further provides liquid silicon rubber (LSR) systems which comprise the surface-modified, pyrogenically prepared silica of the invention.

The invention features the following advantages: greater ease of incorporation into liquid systems without detriment to the rheology control.

EXAMPLES

Preparation of the Comparative Silica 2 kg of AEROSIL® 300 were charged to a mixer and, with mixing, were sprayed first with 0.09 kg of water and subsequently with 0.36 kg of hexamethyldisilazane (HMDS). After the end of spraying, mixing was continued for 15 minutes. The reaction mixture was firstly heated for 5 hours at 65° C. and subsequently heated for 2 hours at 285° C. under a nitrogen atmosphere.

Preparation of the Inventive Silica—Example 2 kg of silica 2 (Table 4 from EP 1 686 093) were charged to a mixer and, with mixing, were sprayed first with 0.09 kg of water and subsequently with 0.36 kg of hexamethyldisilazane (HMDS). After the end of spraying, mixing was continued for 15 minutes. The reaction mixture was firstly heated for 5 hours at 65° C. and subsequently heated for 2 hours at 285° C. under a nitrogen atmosphere.

Physicochemical Data

| Designation | Tapped density [g/l] | Loss on drying [%] | Loss on ignition [%] | pH | C content [%] | BET specific surface area [m²/g] |
|---|---|---|---|---|---|---|
| Comparative silica | 58 | 0.2 | 2.9 | 7.3 | 3.1 | 218 |
| Inventive silica | 60 | 0.1 | 2.9 | 7.1 | 3.1 | 220 |

Determination of Incorporation Characteristics

The incorporation characteristics were determined by measuring the time required for the silica to be completely wetted in a silicone polymer.

800.0 g of silicone polymer (Silopren U 10; GE Bayer) are weighed into the stirring vessel of the planetary dissolver.

200.0 g of silica are added continuously through the inspection glass and are incorporated at a planetary drive speed of 50 $min^{-1}$ and a dissolver speed of 500 $min^{-1}$.

The time needed for the silica to be completely wetted in the silicone polymer is the incorporation time. It should be as small as possible.

Determination of Thickening Effect in a Silicone Polymer

Preparation of the sample:

40 g of silicone polymer U 10 are introduced.

First of all 5.00 g of silica are incorporated in 30 s at 3000 $min^{-1}$. After that a further 5.00 g of silica are incorporated in 30 s at 3000 $min^{-1}$.

This is followed by dispersion for 60 s at 3000 $min^{-1}$. After that the beaker is opened and the wall and the lid are scraped.

After that, dispersion is carried out twice for 60 s at 3000 $min^{-1}$.

The thickening is determined using a RheoStress 1 rheometer from Haake (measuring tools: cone with D=35 mm, 2° measuring plate attachment MPC 35).

Incorporation Characteristics and Thickening Effect—Results

| Designation | Incorporation time [min] | Yield point [Pa] | Viscosity at D = 10 $s^{-1}$ [Pa*s] |
|---|---|---|---|
| Comparative silica | 15 | 0 | 232 |
| Inventive silica | 11 | 0 | 237 |

It is clearly apparent that the inventive silica exhibits much better incorporation characteristics. This means that it is incorporated more rapidly than the comparative silica, despite the fact that not only the thickening effect but also the other physico-chemical data are comparable.

The invention claimed is:

1. A surface-modified, pyrogenically prepared silica which is easily incorporated into liquid resin systems,
   the surface modification consisting of a pyrogenic silica surface having trimethylsilyl groups;
   the surface modified silica being obtained by a process comprising:
   treating a pyrogenically prepared silica with a silane surface modifier consisting of hexamethyldisilazane;
   wherein
   the pyrogenically prepared silica comprises aggregates of primary particles having a BET surface area of 300±25 $m^2/g$,
   an average area of the aggregates is from 4800 to 6000 $nm^2$,
   an average equivalent circle diameter (ECD) of the aggregates is from 60 to 80 nm and
   an average circumference of the aggregates is from 580 to 750 nm.

2. A process for preparing the surface-modified, pyrogenically prepared silica according to claim 1, comprising: treating a pyrogenically prepared silica with a silane surface modifier consisting of hexamethyldisilazane;
   wherein
   the pyrogenically prepared silica comprises aggregates of primary particles having a BET surface area of 300±25 $m^2/g$,
   an average area of the aggregates is from 4800 to 6000 $nm^2$,
   an average equivalent circle diameter (ECD) of the aggregates is from 60 to 80 nm, and
   an average circumference of the aggregates is from 580 to 750 nm.

3. The process according to claim 2, wherein the pyrogenically prepared silica is optionally sprayed with water prior to the treatment with the hexamethyldisilazane.

4. The process according to claim 2, wherein the hexamethyldisilazane is in vapor form for the treatment of the pyrogenically prepared silica, and
   the mixture of the silica and the vapor is thermally treated at a temperature of 50 to 800° C. over a period of 0.1 to 6 h.

5. A method for controlling the rheology of a liquid system, the method comprising adding the surface modified pyrogenically prepared silica according to of claim 1 to the liquid system.

6. The method according to claim 5, wherein the liquid system is a liquid silicone rubber (LSR) system.

* * * * *